(12) United States Patent
Yang et al.

(10) Patent No.: US 7,365,135 B2
(45) Date of Patent: Apr. 29, 2008

(54) METHOD FOR PREPARING A NOVOLAC PHENOLIC RESIN/SILICA HYBRID ORGANIC-INORGANIC NANOCOMPOSITE

(75) Inventors: Jeng-Cheng Yang, Tao-Yuan (TW);
Chen-Chi Martin Ma, Hsinchu (TW);
Hon-Bin Chen, Tao-Yuan (TW);
Chin-Yih Chen, Tao-Yuan (TW)

(73) Assignee: Chung-Shan Institute of Science & Technology, Tao-Yuan (TW)

( * ) Notice: Subject to any disclaimer, the term of this patent is extended or adjusted under 35 U.S.C. 154(b) by 878 days.

(21) Appl. No.: 10/865,825

(22) Filed: Jun. 14, 2004

(65) Prior Publication Data

US 2005/0284087 A1    Dec. 29, 2005

(51) Int. Cl.
*C08G 8/28* (2006.01)
(52) U.S. Cl. ...................... 525/507; 525/393
(58) Field of Classification Search ............... 525/393, 525/507
See application file for complete search history.

(56) References Cited

U.S. PATENT DOCUMENTS

| | | | | |
|---|---|---|---|---|
| 4,474,930 | A * | 10/1984 | Mikami et al. | 525/507 |
| 5,641,839 | A * | 6/1997 | Asano et al. | 525/480 |
| 6,566,456 | B1 * | 5/2003 | Yang et al. | 525/326.5 |
| 7,034,089 | B2 * | 4/2006 | Herr et al. | 525/479 |
| 7,192,997 | B2 * | 3/2007 | Papathomas | 523/442 |
| 7,220,484 | B2 * | 5/2007 | Ton-That et al. | 428/407 |

* cited by examiner

*Primary Examiner*—Bernard Lipman
(74) *Attorney, Agent, or Firm*—Bacon & Thomas, PLLC

(57) ABSTRACT

The method of the present invention includes grafting a glycidyl alkylene trialkoxy silane to a novolac phenolic resin in an organic solvent to form a modified novolac phenolic resin; mixing a tetralkoxy silane, an acid and water with the resulting organic solution containing the modified novolac phenolic resin, wherein hydrolysis and condensation reactions are carried out to form a —Si—O—Si— bonding; adding a curing agent for novolac phenolic resin to the resulting reaction mixture; evaporating the organic solvent and acid from the resulting mixture and heating the resulting mixture to form a novolac phenolic resin/silica hybrid organic-inorganic nanocomposite.

12 Claims, No Drawings

METHOD FOR PREPARING A NOVOLAC PHENOLIC RESIN/SILICA HYBRID ORGANIC-INORGANIC NANOCOMPOSITE

FIELD OF THE INVENTION

The present invention relates to a novolac phenolic resin/silica hybrid organic-inorganic nanocomposite, and particularly to a method for preparing a novolac phenolic resin/silica hybrid organic-inorganic nanocomposite by a sol-gel method.

BACKGROUND OF THE INVENTION

An organic/inorganic hybride material is sometimes called a ceramer, i.e. ceramic and polymer, which is a nano grade composite material obtained by mixing an organic material with an inorganic material in nano dimension. Intermolecular interactions, e.g. van der Waals' force, hydrogen bond, and chemical bonds, endow a synergistic effect on the organic/inorganic material.

In U.S. Pat. No. 6,566,456 vinylimidazole and [3-(methacryloxy)propyl]trimethoxysilane are copolymerized to form a modified polyvinylimidazole, which then undergoes hydrolysis and condensation reactions with water and tetramethoxysilane to prepare a hybrid of polyvinylimidazole and silica. Experimental analyses show that covalent bondings exist between the modified polyvinylimidazole and silica in the hybrid Since a phenolic resin has phenoxy and methylene groups which are strong oxidative groups, the phenolic resin has poorer weather resistance, thermal oxidative resistance, and chemical resistance. Moreover, a phenolic resin is limited in its applications due to a high thermal expansion coefficient and difficulties in processing. However, major drawbacks of the phenolic resin include its brittleness, poor toughness, and poor mechanical properties, which adversely affect its applications greatly. On the other hand, the phenolic resin has good thermal stability, and electrical insulation property, etc. Furthermore, a composite material based on a phenolic resin has properties including fireproofing and flame retardance, etc. Therefore, the phenolic resin has become one of the important resins used as a fireproofing material.

Silica has a very low water absorbency (~0 wt %) and thermal expansion coefficient (~0.5 ppm/K) and is a very ideal inorganic material for endowing a polymer such properties. However, if a hybrid material does not form any chemical bonding (particularly a stable covalence bonding) between a polymer and silica, such a hybrid material will have defects such as poor thermal stability, or even have a phase separation problem, which further affects the mechanical properties of the resulting hybrid material.

SUMMARY OF THE INVENTION

One objective of the present invention is to provide a method for preparing a novolac phenolic resin/silica hybrid organic-inorganic nanocomposite with covalence bonding.

A method for preparing a novolac phenolic resin/silica organic-inorganic nanocomposite according to the present invention comprises the following steps:

a) grafting a glycidyl alkylene trialkoxy silane having a formula (I) to a novolac phenolic resin in an organic solvent to form a modified novolac phenolic resin of formula (II), wherein hydroxy groups of said novolac phenolic resin and epoxy groups of said glycidyl alkylene trialkoxy silane undergo a ring opening reaction:

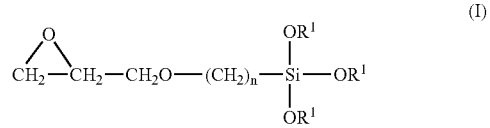

wherein $R^1$ is $C_1$-$C_4$ alkyl, and n is an integer of 1-6;

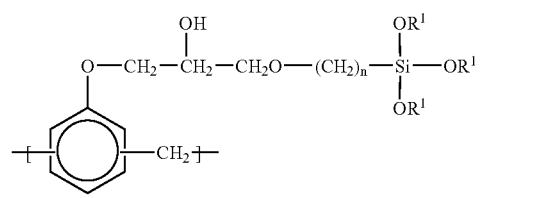

wherein $R^1$ and n are defined as above;

b) mixing a tetralkoxy silane, $Si(OR^2)_4$, wherein $R^2$ is $C_1$-$C_4$ alkyl, an acid and water with the modified novolac phenolic resin in Step a), such that alkoxy groups of said tetralkoxy silane and the alkoxy groups of said modified novolac phenolic resin are hydrolyzed into hydroxy groups, and undergo a condensation reaction to form a —Si—O—Si— bonding;

c) adding a curing agent for novolac phenolic resin to the resulting reaction mixture from Step b);

d) removing the organic solvent and water from the mixture resulting from Step c) by evaporation; and e) heating the resulting mixture from Step d) so that a portion of the novolac phenolic resin in the condensation production of Step b) is cross-linked to form a novolac phenolic resin/silica hybrid organic-inorganic nanocomposite.

Preferably, n is 3, $R^1$ is methyl, and $R^2$ is ethyl.

Preferably, 1-30 parts by weight of said glycidyl alkylene trialkoxy silane is used per 100 parts by weight of the novolac phenolic resin in Step a).

Preferably, 5-40% by weight of tetralkoxy silane is used in Step b), based on the total weight of the novolac phenolic resin and the tetralkoxy silane.

Preferably, said tetralkoxy silane, water and acid are added into an organic solvent identical to the organic solvent used in Step a) to form a uniform solution, and then said uniform solution is mixed with the organic solution containing said modified novolac phenolic resin in Step a), wherein a concentration of said acid in said uniform solution is 0.01-5 wt %, and a mole ratio of said tetralkoxy silane to water is 0.1-1. More preferably, wherein said acid is hydrochloric acid.

Preferably, said organic solvent in Step a) is selected from the group consisting of tetrahydrofuran (THF), N-methyl-2-pyrrolidone (NMP), N,N-dimethylacetamide (DMAc), dimethylformamide (DMF), dimethylsulfoxide (DMSO), m-cresol, pyridine (Py), methyl chloride, ethyl chloride, and a combination thereof. More preferably, said organic solvent is tetrahydrofuran.

Preferably, the curing agent for the novolac phenolic resin in Step c) is hexamethylene tetramine, trimethylol phosphine oxide, or S-triamine, and an amount of said curing agent used is 1-20 parts by weight per 100 parts by weight of said novolac phenolic resin. More preferably, said curing agent is hexamethylene tetramine.

Preferably, Step d) and Step e) are carried out simultaneously.

Alternatively, Step d) and Step e) are carried out in a reversed order.

When a silicon-containing glycidyl compound is introduced into a novolac phenolic resin to prepare an organic/inorganic hybrid composite material according to the present invention, the mechanical properties of the novolac phenolic resin are improved, and the thermal and combustion properties of the resulting composite material are better than the original novolac phenolic resin. The resulting composite material has a better thermal stability at high temperature. Furthermore, the invented method uses a coupling agent to improve the problem of phase separation between an organic phase and an inorganic phase, so that the resulting composite material has more stable properties, and an optical clarity no less than the original novolac phenolic resin.

DETAILED DESCRIPTION OF THE INVENTION

The present invention adopts a sol-gel method to prepare a novolac phenolic resin/silica hybrid organic-inorganic nanocomposite.

The present invention uses a coupling agent to reduce the phase separation between an organic phase and an inorganic phase in the hybrid organic-inorganic nanocomposite, wherein the covalence bonds are formed through the coupling agent, where such a formation can be identified by a FT-IR spectrum. A $^{29}Si$ solid NMR has identified that the geometric structure of an inorganic network-like crosslinking of a composite according to the present invention is mainly $T_3$ substitutions.

A SEM observation has shown that the inorganic particles of the composite material of the present invention are less than 100 nm. Moreover, a nanocomposite of the present invention also has conspicuous improvements in thermal and mechanical properties. In a preferred embodiment according to the present invention, an organic/inorganic hybrid composite prepared has a 5% pyrolysis weight loss temperature of about 350° C. in a thermogravimetric analysis (TGA) compared to 281° C. of a pure novolac phenolic resin, a flexural strength increased for about 50%, and a flexural modulus increased for about 100%.

Regarding to the combustion properties, the limiting oxygen index (L.O.I.) test indicates that a nanocomposite of the present invention has met the standard for a flame retardant material with a L.O.I. value reaching 35. A UL-94 heat resistance test indicates that a nanocomposite of the present invention is classified as V-0 grade. These test results indicate that a nanocomposite prepared according to the present invention has an excellent flame resistance.

The present invention can be better understood by the following examples, which are for illustrative only and not for limiting the scope of the present invention.

PREPARATION EXAMPLE

3-Glycidoxypropyltrimethoxysilane (GPTS) was used as a coupling agent to modify a phenolic resin, abbreviated as GPTS-phenolic resin.
1. A novolac phenolic resin was dissolved in tetrohydrofuran (THF) to form a solution with a solid content of 50 wt %.
2. GPTS was slowly added to the phenolic solution in 5 phr, 10 phr, and 15 phr (parts by weight per 100 parts by weight of the phenolic resin) so that the epoxy groups on the GPTS and the hydroxy groups on the phenolic resin undergo a ring-opening reaction with a reaction formula shown in the following:

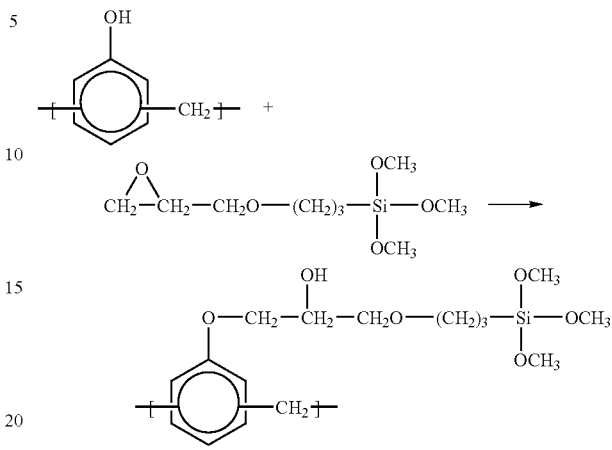

3. The solution was mixed uniformly with the aid of a magnet stirrer at 70° C. under refluxing to maintain a constant concentration. Meanwhile, an IR instrument was used to monitor the reaction of the functional groups. The reaction was complete in about 20~24 hours, and a GPTS-phenolic resin solution was formed.

CONTROL AND EXAMPLES

1. Solution A was a GPTS-phenolic resin solution prepared in the abovementioned preparation example.
2. 20 wt % of tetraethoxysilane (TEOS) (based on the total weight of the phenolic resin and TEOS) and a quantitative amount of deionized water was mixed in tetrohydrofuran (THF) to perform a hydrolysis reaction under the catalysis of hydrochloric acid (HCl) at 25° C. for 30 minutes while stirring, so that a uniform clear solution (Solution B) was formed, wherein the molar ratio of TEOS/$H_2O$ was 1/4, HCl was 0.03 wt % of Solution B, and THF was 50 wt % of Solution B.
3. Solution A and Solution B was mixed and uniformly agitated by a magnet stirred for 2 hours to continue a hydrolysis condensation reaction. Next, 10 phr of hexamethylene tetramine (pre-dissolved in THF) was added as a curing agent to form a sol-gel solution (Solution C).
4. Solution C was placed at room temperature for 2~3 days, then placed still in an over at 80° C. for 2 hr, then at 100° C. for 2 hr for solvent removal, then at 120° C. for 2 hr. then at 180° C. for 2 hr for curing, and then at 200° C. for 4 hr for post-curing.
5. The codes and compositions of the samples prepared are shown in Table 1:

TABLE 1

| | Pure or modified phenolic resin | | |
|---|---|---|---|
| Sample | Phenolic resin (wt %) | GPTS (phr) | TEOS (wt %) |
| P80T20-G0 | 80 | 0 | 20 |
| P80T20-G5 | 80 | 5 | 20 |
| P80T20-G10 | 80 | 10 | 20 |
| P80T20-G15 | 80 | 15 | 20 |

The synthesis reaction of the GPTS-phenolic resin mainly involves a ring-opening reaction for the epoxy groups and the hydroxy groups (—OH). An IR spectrometer was used to analyze a pure phenolic resin and a modified GPTS-phenolic resin. The characteristic absorption of an epoxy group of the GPTS is at 914 cm$^{-1}$, and the hydroxy group of a pure phenolic resin is at 3000~3600 cm$^{-1}$. For the modified GPTS-phenolic resin, the ring opening of the epoxy group causes a gradual narrowing of the peak at 914 cm$^{-1}$. Furthermore, the ring opening causes the tension on the ring to disappear, so that the out-of-plane bending absorption of C—H is shifted to a lower frequency of about 889 cm$^{-1}$. The configuration of the hydroxy group formed after the ring-opening reaction is different from that of the hydroxy group on the original phenolic resin. Therefore, the absorption peak range of the characteristic absorption range of the hydroxy group at 3000~3600 cm$^{-1}$ becomes broadening gradually. Furthermore, a C—O stretching different from the C—O stretching at 1100 cm$^{-1}$ is formed after the ring opening, which is nearby the 1100 cm$^{-1}$ absorption peak of the C—O stretching.

A $^{29}$Si solid NMR was used to analyze the samples in Table 1. The $^{29}$Si solid NMR can analyze the distribution of Si bondings in an organic/inorganic hybrid material in order to understand the bonding of siloxane in a network-like crosslinking structure resulting from the sol-gel reaction.

TEOS was used to carry out a sol-gel reaction with the pure phenolic resin and the modified GPTS-phenolic resin to form the organic/inorganic hybrid materials, wherein the siloxane undergoes hydrolysis and condensation reactions to form a silica network structure of an inorganic phase. However, its bondings were not ideal, and various types of bonding were developed. $^{29}$Si solid NMR spectra of the products of the hydrolysis and condensation reactions of TEOS show that: when —O—Si—O— bonding is bi-substituted (Q2), a characteristic absorption peak appears at -91 ppm~-93 ppm in the $^{29}$Si solid NMR spectrum; when —O—Si—O— bonding is tri-substituted (Q3), a characteristic absorption peak appears at -99 ppm~-102 ppm; when —Si—O— is tetra-substituted (Q4), a characteristic absorption peak appears at -109 ppm~-110 ppm on the $^{29}$Si solid NMR diagram. Furthermore, if one end of the siloxane is covalently bonded to a polymer, a characteristic absorption peak appears at -50 ppm ~-52 ppm in the $^{29}$Si solid NMR spectrum when —O—Si—O— bonding is mono-substituted (T$_1$); a characteristic absorption peak appears at -58 ppm ~-60 ppm in the $^{29}$Si solid NMR spectrum when —O—Si—O— bonding is bi-substituted (T$_2$), and a characteristic absorption peak appears at 65 ppm ~-67 ppm in the $^{29}$Si solid NMR diagram when —O—Si—O— bonding was tri-substituted (T$_3$).

From the $^{29}$Si solid NMR spectra, the —O—Si—O— bondings formed by TEOS in the P80T20-G0 hybrid material in Table 1 mainly is tetra-substituted (Q4), followed by tri-substituted (Q3) and bi-substituted (Q2). In the hybrid materials of P80T20-G5, P80T20-G10 and P80T20-G15 in Table 1, one end of TEOS being covalently bonded to the phenolic resin, the —O—Si—O— bondings mainly are tri-substitutions (T$_3$), secondarily are bi-substitutions (T$_2$) and then mono-substitutions (T$_1$).

A scanning electron microscope (SEM) was used to observe the distribution of inorganic particles in the organic polymer of the hybrid materials in Table 1. From the SEM sectional views of the hybrid materials in Table 1, the distribution and particle size of SiO$_2$ for the modified phenolic resin cases are conspicuously different from the un-modified phenolic resin case. The phase separation in the former hybrid composites is only limited to a micro-phase separation and is not conspicuous. Regarding dispersity, the hybrid materials prepared from the modified phenolic resins are more uniform and the particles contained therein are generally smaller than 0.5 μm with un-agglomerated particles smaller than 100 nm. As a result, the hybrid materials prepared from the modified phenolic resins have better optical clarity than the hybrid material prepared from the un-modified phenolic resins (P80T20-G0). Therefore, when a coupling agent is used to form a covalence bonding between a phenolic resin and a silicon dioxide network structure, together with the original hydrogen bonding, the resulting hybrid material has a better organic/inorganic compatibility than the hybrid material with only hydrogen bonding, and the former material is capable of effectively reducing the size of inorganic particles.

When the amount of coupling agent used is 10 phr (P-80T20-G10), the resulting hybrid material is most unlikely to have particle agglomerations, and its SiO$_2$ particles are mostly smaller than 100 nm with a dispersity conspicuously better than the other hybrid materials (P80T20-G5 and P80T20-G15). Thus, when the modifier used is 10 phr, the resulting hybrid material has the least organic/inorganic phase separation, best dispersity, and best optical clarity.

A thermogravimetric analysis (TGA) was used to measure the pyrolysis weight loss temperature and the char yield in nitrogen (N$_2$) for the organic/inorganic hybrid materials of Table 1, and the results are shown in Table 2.

The results in Table 2 indicate that in a nitrogen (N$_2$) test environment, the 5 wt % and 10 wt % pyrolysis weight loss temperatures for a hybrid material prepared from a modified phenolic resin and TEOS by a sol-gel method are all higher than those of a pure phenolic resin, as well as higher than those of an unmodified P80T20-G0 hybrid material. When the amount of GPTS modification is 10 phr (P80T20-G10), the resulting hybrid material has the highest pyrolysis weight loss temperatures, i.e. about 350° C. at 5 wt % and about 439° C. at 10 wt %, respectively. In comparison with a pure phenolic resin, the modified hybrid materials have better thermal stability and char yield; however, in comparison with the unmodified hybrid material ((P80T20-G0), the modified hybrid materials have comparable or slightly better thermal stability and char yield. These results are due to the introduction of a silica network structure, causing the thermal stability and char yield to increase. The reasons for the GPTS-phenolic resin/TEOS system having better performance than the phenolic resin/TEOS system in Table 2 are probably the covalent bonding and the better dispersity of silica particles in the former.

TABLE 2

| Sample | 5% weight loss temperature (° C.) | 10% weight loss temperature (° C.) | Char yield (wt %) |
|---|---|---|---|
| Pure phenolic resin | 281.78 | 365.27 | 56.1 |
| P80T20-G0 | 315.14 | 401.02 | 61.4 |
| P80T20-G05 | 315.49 | 406.10 | 60.8 |
| P80T20-G10 | 350.78 | 439.87 | 63.3 |
| P80T20-G15 | 335.42 | 427.56 | 64.0 |

The Limiting Oxygen Index (L.O.I.) test was used to measure the lowest oxygen concentration needed in sustaining a burning flame in a system with a flowing mixture of oxygen and nitrogen at room temperature. Table 3 shows that a cross-linked network system introduced with inorganic silica can increase the flame retardancy of the hybrid materials to be over 35, which has exceeded a flame retardancy standard of 26.

The vertical combustion method for flame retardancy standards classifies the flame retardancy of specimens into UL94V-0, UL94V-1 and UL94V-2. All specimens in Table 3 do not form molten drippings during the test, and therefore do not cause the absorbent cotton to burn. Even though the specimen of the pure phenolic resin can be combusted, the combustion time is less than 30 s, which meets the 94V-1 standard. The combustion time of the specimens of the hybrid materials are all less than 10 s, which meets the 94V-0 standard.

TABLE 3

| Sample | UL-94 | L.O.I. | Results |
|---|---|---|---|
| Pure phenolic resin | 94V-1 | 33 | Non-dripping, combustion time less than 30 s |
| P80T20-G0 | 94V-0 | 35 | Non-dripping, combustion time less than 10 s |
| P80T20-G05 | 94V-0 | 35 | |
| P80T20-G10 | 94V-0 | 35 | |
| P80T20-G15 | 94V-0 | 35 | |

A universal tester was used to measure the three-point flexural strength and the flexural modulus according to ASTM-D790 for the specimens of the hybrid materials listed in Table 1 and a pure phenolic resin, and the results are shown in Table 4.

Table 4 shows that the modified hybrid materials have a better flexural strength than the un-modified hybrid material (P80T20-G0). In particular, the modified hybrid material containing 10 phr of modifier (P80T20-G10) has a flexural strength about 16% higher than that of the un-modified hybrid material (P80T20-G0). This result is consistent with the result in Table 2, which is probably caused by the covalent bonding and the better dispersity of silica particles in the modified hybrid material (P80T20-G10).

TABLE 4

| Sample | Flexural strength (MPa) | Flexural modulus (MPa × $10^2$) |
|---|---|---|
| Pure phenolic resin | 27.81 ± 0.62 | 19.60 ± 0.48 |
| P80T20-G0 | 36.06 ± 1.96 | 40.49 ± 2.13 |
| P80T20-G05 | 38.50 ± 1.53 | 39.51 ± 1.55 |
| P80T20-G10 | 41.90 ± 0.92 | 37.98 ± 2.47 |
| P80T20-G15 | 35.01 ± 2.11 | 39.90 ± 3.04 |

The invention claimed is:

1. A method for preparing a novolac phenolic resin/silica organic-inorganic nanocomposite, which comprises the following steps:
    a) grafting a glycidyl alkylene trialkoxy silane having a formula (I) to a novolac phenolic resin in an organic solvent to form a modified novolac phenolic resin of formula (II), wherein hydroxy groups of said novolac phenolic resin and epoxy groups of said glycidyl alkylene trialkoxy silane undergo a ring opening reaction:

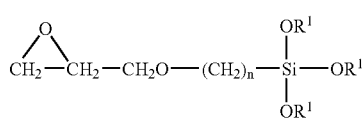

wherein $R^1$ is $C_1$-$C_4$ alkyl, and n is an integer of 1-6;

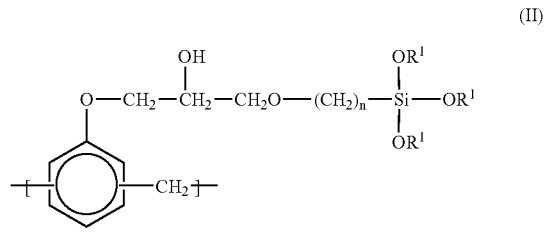

wherein $R^1$ and n are defined as above;
    b) mixing a tetralkoxy silane, $Si(OR^2)_4$, wherein $R^2$ is $C_1$-$C_4$ alkyl, an acid and water with the modified novolac phenolic resin in Step a), such that alkoxy groups of said tetralkoxy silane and the alkoxy groups of said modified novolac phenolic resin are hydrolyzed into hydroxy groups, and undergo a condensation reaction to form a —Si—O—Si— bonding;
    c) adding a curing agent for novolac phenolic resin to the resulting reaction mixture from Step b);
    d) removing the organic solvent and water from the mixture resulting from Step c) by evaporation; and
    e) heating the resulting mixture from Step d) so that a portion of the novolac phenolic resin in the condensation production of Step b) is cross-linked to form a novolac phenolic resin/silica hybrid organic-inorganic nanocomposite.

2. The method as claimed in claim 1, wherein n is 3, $R^1$ is methyl, and $R^2$ is ethyl.

3. The method as claimed in claim 1, wherein 1-30 parts by weight of said glycidyl alkylene trialkoxy silane is used per 100 parts by weight of the novolac phenolic resin in Step a).

4. The method as claimed in claim 1, wherein 5-40% by weight of tetralkoxy silane is used in Step b), based on the total weight of the novolac phenolic resin and the tetralkoxy silane.

5. The method as claimed in claim 1, wherein in Step b) said tetralkoxy silane, water and acid are added into an organic solvent identical to the organic solvent used in Step a) to form a uniform solution, and then said uniform solution is mixed with the organic solution containing said modified novolac phenolic resin in Step a), wherein a concentration of said acid in said uniform solution is 0.01-5 wt %, and a mole ratio of said tetralkoxy silane to water is 0.1-1.

6. The method as claimed in claim 5, wherein said acid is hydrochloric acid.

7. The method as claimed in claim 1, wherein said organic solvent in Step a) is selected from the group consisting of tetrahydrofuran, N-methyl-2-pyrrolidone, N,N-dimethylacetamide, dimethylformamide, dimethylsulfoxide, m-cresol, pyridine, methyl chloride, ethyl chloride, and a combination thereof.

8. The method as claimed in claim 7, wherein said organic solvent is tetrahydrofuran.

9. The method as claimed in claim 1, wherein the curing agent for the novolac phenolic resin in Step c) is hexamethylene tetramine, trimethylol phosphine oxide, or S-triamine, and an amount of said curing agent used is 1-20 parts by weight per 100 parts by weight of said novolac phenolic resin.

10. The method as claimed in claim 9, wherein said curing agent is hexamethylene tetramine.

11. The method as claimed in claim 1, where Step d) and Step e) are carried out simultaneously.

12. The method as claimed in claim 1, wherein Step d) and Step e) are carried out in a reversed order.

* * * * *